United States Patent

[11] 3,630,780

[72] Inventors Dietrich Berndt
Kronberg;
Walter K. Lux, Garching an der Alz; Kurt Weidinger, Friedrichsdorf, all of Germany
[21] Appl. No. 54,839
[22] Filed July 14, 1970
[45] Patented Dec. 28, 1971
[73] Assignee Varta Aktiengesellschaft
Frankfurt am Main, Germany
[32] Priority Aug. 5, 1969
[33] Germany
[31] P 19 39 713.8

[54] METHOD OF PRODUCING SILVER OXIDE AND NICKEL CONTAINING ELECTRODES FOR ELECTRIC BATTERIES
6 Claims, No Drawings

[52] U.S. Cl. .................................................. 136/20, 136/120
[51] Int. Cl. .................................................... H01m 13/00
[50] Field of Search .......................................... 136/20, 21, 120, 28–29, 34–35, 75; 75/206, 214, 208, 224; 29/182.1, 182; 264/104, 111

[56] References Cited
UNITED STATES PATENTS

| | | | |
|---|---|---|---|
| 2,830,108 | 4/1958 | Peters............................ | 136/20 |
| 3,104,990 | 9/1963 | Solomon et al. ............... | 136/20 |
| 3,230,114 | 1/1966 | Friese et al. ................... | 136/120 X |
| 3,276,975 | 10/1966 | Holechek ....................... | 136/20 X |
| 3,389,019 | 6/1968 | Biro................................ | 136/120 |

*Primary Examiner*—A. Skapars
*Attorneys*—Curt M. Avery, Arthur E. Wilfond, Herbert L. Lerner and Daniel J. Tick

ABSTRACT: Silver oxide electrodes for electric batteries, particularly primary batteries capable of delivering a high-temporary current output, are produced by compressing a mixture of 10 to 40 percent by weight of pulverulent silver oxide and 60 to 90 percent of pulverulent nickel, and hard-pressing the resulting compressed layer onto a carrier structure, preferably of copper or silver, at pressures of about 0.5 to about 1.4 $t/cm.^2$ in an oxidizing or inert atmosphere at a hot-pressing temperature below the dissociation temperature of the silver oxide, this temperature being generally between about 100° and about 300° C.

METHOD OF PRODUCING SILVER OXIDE AND NICKEL CONTAINING ELECTRODES FOR ELECTRIC BATTERIES

Our invention relates to a method of producing silver oxide electrodes for electric batteries by compressing a mixture of silver oxide powder and nickel powder and nickel powder. In a preferred though not exclusive aspect the invention particularly concerns primary batteries that are to be used under temporarily high electric load conditions.

Electrodes containing silver oxide as an electrochemically active mass are produced, as a rule, by converting a loose structure of elemental silver into silver oxide by subjecting the structure to a formation treatment.

In such production methods, silver powder may directly be sintered, or the starting material may consist of silver oxide which is deposited as a paste upon a carrier structure. The mass is then heated and thus thermally converted to sintered elemental silver powder and is ultimately subjected to after-pressing. Electrodes produced from silver oxide in this manner can be more readily and more satisfactorily converted by the forming treatment, so that the resulting electrodes, as a rule, comprise a sinter skeleton which, in most cases, contains a grid structure of silver stretch meal for mechanical reenforcement and as an electric current conductor. For formation of such electrodes, they are anodically oxidized in alkaline solutions. Thus, an oxidation degree of $AgO_{0.7}$ to $AgO_{0.9}$ is attained. Hence, the current delivering capacity (measured, for example, in ma./h.) of such electrodes is lower than that of electrodes which contain pure AgO. Besides, the formation-treated electrodes are often found to retain alkali remainders which detrimentally affect the storage ability. The production of such electrodes is expensive and time consuming.

Silver oxide electrodes with better electrochemical properties, although of only very slight mechanical strength, can also be produced directly from silver oxide (preferably silver II-oxide) either by dry prepressing under high pressure or from a paste of water and silver oxide. A higher mechanical strength of such electrodes can be attained by adding organic binding agents.

For special purposes, there is a demand for primary elements and batteries that are capable of delivering for a short interval of time, such as several seconds up to several minutes, a very high amount of electric current at a relatively uniform voltage level. Such batteries are to be applicable down to low ambient temperatures and, particularly, are to remain storable for prolonged periods of time.

Attempts to meet these severe demands with the aid of activatable silver-zinc batteries, have shown that sintered and formation-treated silver oxide electrodes that possess a sufficient mechanical strength must contain a multiple of the silver oxide quantity needed for ordinary, less exacting requirements. On the other hand, silver oxide pressed electrodes with organic binding agents are not suitable if it must be possible to heat the electrolyte as well as the electrode plates of the activatable battery, because the mixture of oxidizing agent and oxidizable substance present in such batteries may cause an explosive decomposition of the battery.

For these reasons, the above-mentioned requirements with respect to temporary high loadability and prolonged storability make nickel powder particularly well suitable as a binding agent for the electrodes. Such use of nickel powder as a binder in silver electrodes is known per se, for example from the German Pat. No. 946,071. In this patent it is proposed to produce a silver-containing positive electrode by sintering a mixture of nickel powder with silver powder or pulverized silver compounds. Only slight quantities of nickel powder, to act as a binding agent, are employed and the sintering is effected at the conventional high sinter temperatures of about 700° to 900° C. For attaining a high activity of such an electrode, a formation is needed by means of which, however, no optimum of the oxidation degree of the silver oxide can be secured.

It is an object of our invention to produce a silver oxide electrode suitable for the above-mentioned uses requiring a high temporary electrical loadability as well as satisfactory storageability, while also avoiding the above-mentioned disadvantages of the known silver oxide electrodes.

To this end, and in accordance with our invention, we produce silver oxide electrodes for electric batteries by compressing into the shape of a layer a mixture of 10 to 40 percent by weight of silver oxide powder and 60 to 90 percent of nickel powder, and we then hot-press the resulting layer onto a carrier structure at a pressure of about 0.5 to about 1.4 t/cm² in an oxidizing or inert atmosphere at a hot-pressing temperature below the dissociation temperature of the silver oxide.

When using silver (II)-oxide powder, the hot-pressing temperature is kept preferably between about 100° and 110° C. When using silver (I)-oxide, the temperature of the hot-pressing operation may be in the range of about 100° to about 300° C. and is preferably between 250° and 300° C.

Suitable as carrier of the pressed body are particularly silver-plated or nickel-plated and perforated copper sheets, also grid or mesh structures of copper or copper stretch metal. Likewise suitable as carrier structure is perforated silver sheet material, silver mesh or grid structure, or silver stretch metal.

The hot pressing operation may be performed in air or in a nitrogen atmosphere. Particularly well suitable as pulverulent silver for the processes according to the invention are chemically produced silver oxide powders. Preferably employed as nickel powder for the purpose of the invention is pulverulent nickel made by the carbonyl process and having a low bulk density.

In the following, the method according to the invention will be further illustrated with reference to a specific example.

EXAMPLE

Twenty-five g. of chemically produced silver (I)-oxide were intimately mixed with 75 g. nickel powder having a bulk density of about 0.55 g./ml. For producing electrode plates (64×47×mm.), the mixture was converted to the shape of layers, each having a rectangular size of 64×47 mm. and each consisting of 3.5 g. of the mixed mass. Some of the layers were made by pressing the mixture in moulds under a pressure of 0.8 t/cm.², others were made by rolling with a gap of 0.2 mm. between rollers having a roller diameter of 80 mm.

The layers made in this manner are sufficiently strong and self-supporting for the further fabrication.

Two such layers were placed into a hot-pressing mold together with an interposed current conductor of perforated and silver-coated copper sheet material. The mold was heated in a furnace under a nitrogen atmosphere to 250° C. and at this temperature was compressed at a pressure of 1 t/cm.².

These electrodes, at normal room temperature (about 70° C.) and a surface loading of 150 ma./cm.² exhibited a current delivering capacity of about 250 ma.-hr.

Advantageously applicable as counter-electrodes are zinc electrodes of the same size consisting of fine zinc foil. These are first defatted with trichlorethylene and then superficially etched in 5 percent hydrochloric acid for a period of 5 to 10 minutes.

Upon a study of this disclosure it will be apparent to those skilled in the art, that our invention permits of various modifications and hence may be embodied in specific methods and resulting products other than those particularly described herein, without departing from the essential features of the invention, and within the scope of the claims annexed hereto.

We claim:

1. The method of producing silver oxide electrodes for electric batteries, such as temporarily highly loadable primary batteries, which comprises compressing and forming layer from a mixture of 10 to 40 percent by weight of pulverulent silver oxide and 60 to 90 percent of pulverulent nickel, and hot-pressing the resulting layer onto a carrier at pressures of about 0.5 to about 1.4 t/cm.² in an oxidizing or inert atmosphere at a hot-pressing temperature between about 100° and about 300° C.

2. The method according to claim 1 wherein the pulverulent silver oxide is silver (II)-oxide, and the hot-pressing temperature is between 100° and 110° C.

3. The method according to claim 1 wherein the pulverulent silver oxide is silver (II)-oxide, and the hot-pressing temperature is between 250° and 300° C.

4. The method according to claim 1, wherein the carrier is formed substantially of copper or silver.

5. The method according to claim 1, wherein the carrier is formed of nickel-plated copper.

6. The method according to claim 1, wherein the carrier is formed of nickel-coated copper stretch metal.

* * * * *